United States Patent [19]
Von Schalscha

[11] Patent Number: 4,854,538
[45] Date of Patent: Aug. 8, 1989

[54] APPLIANCE MOUNTING DEVICE

[76] Inventor: Craig Von Schalscha, 629 Vendola Dr., San Rafael, Calif. 94903

[21] Appl. No.: 211,257

[22] Filed: Jun. 24, 1988

[51] Int. Cl.[4] ............................................. A47B 91/00
[52] U.S. Cl. ............................... 248/346; 224/42.45 R
[58] Field of Search ...................... 248/278, 346, 280.1, 248/184, 282; 224/42.45 R; 108/44; 211/26; 312/7

[56] References Cited

U.S. PATENT DOCUMENTS

| | | | |
|---|---|---|---|
| 3,658,219 | 4/1972 | Ordt | 224/42.42 R |
| 3,685,708 | 8/1972 | Herrington | 224/42.42 R |
| 3,727,813 | 4/1973 | Eby | 108/44 |
| 3,964,612 | 6/1976 | Skilliter | 211/26 |
| 4,097,012 | 6/1978 | McIntyre | 248/278 X |
| 4,447,031 | 5/1984 | Souder | 248/280.1 |
| 4,562,987 | 1/1986 | Leeds | 248/278 |
| 4,687,167 | 8/1987 | Skalka | 248/282 |
| 4,729,533 | 3/1988 | Hillary | 248/184 |

*Primary Examiner*—J. Franklin Foss
*Attorney, Agent, or Firm*—Glen R. Grunewald; Thomas R. Lampe

[57] ABSTRACT

A device for mounting an appliance such as a computer in a motor vehicle having an elevated tunnel and a seat adjacent to the tunnel, the device including stabilizing means for resisting movement of the device relative to the tunnel and seat.

3 Claims, 2 Drawing Sheets

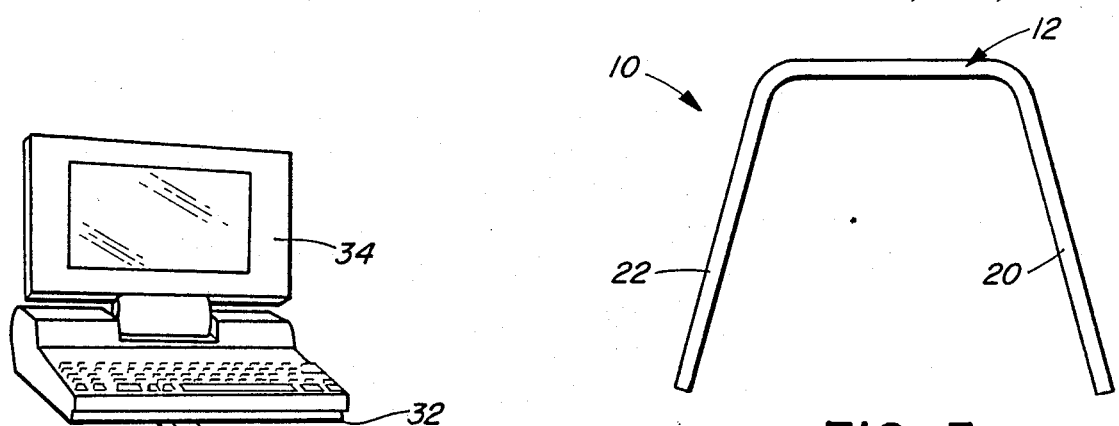
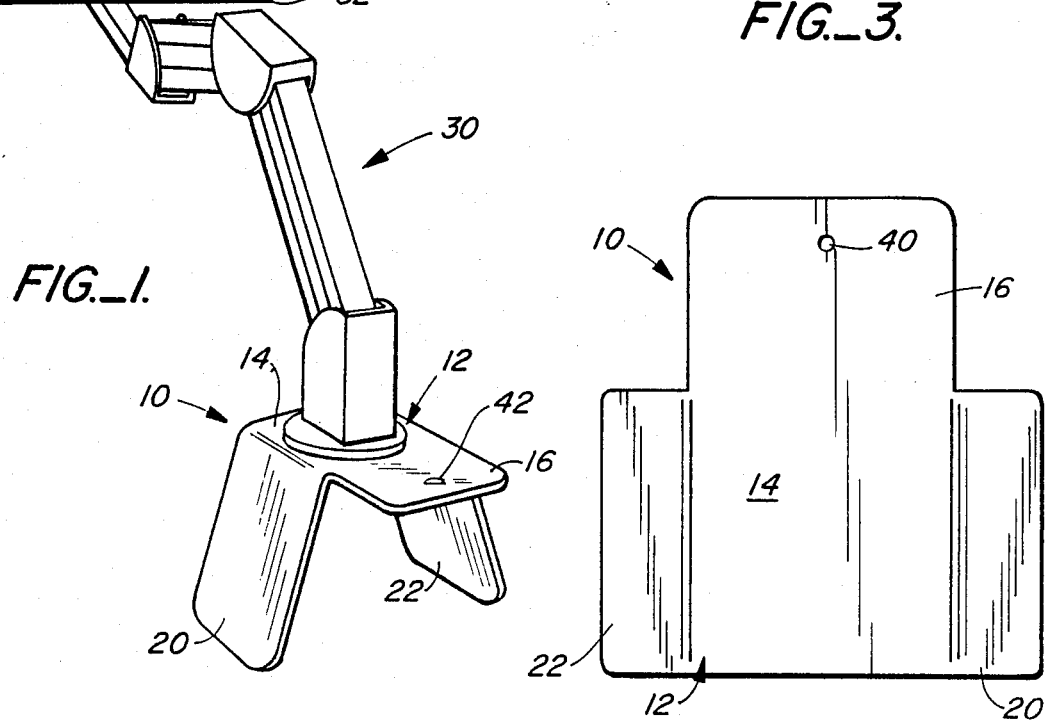
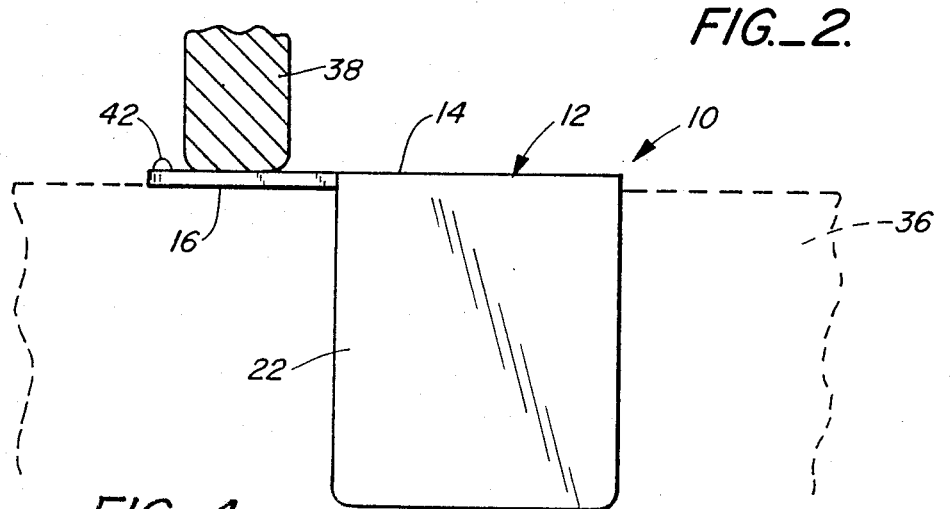

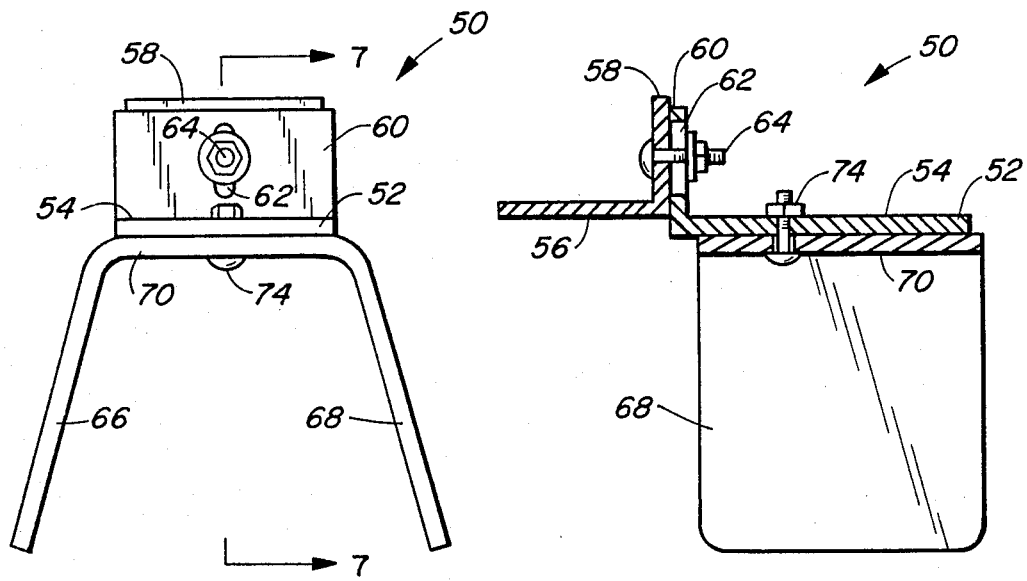
FIG._5.
FIG._7.
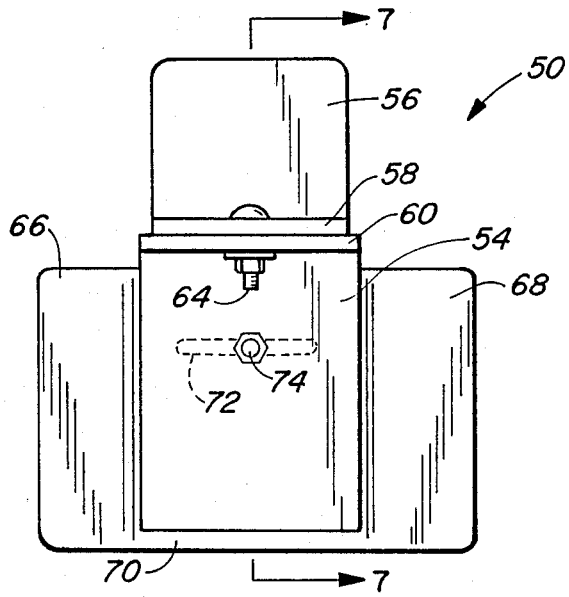
FIG._6.

4,854,538

APPLIANCE MOUNTING DEVICE

TECHNICAL FIELD

This invention relates to an appliance mounting device. More specifically, the device is specifically adapted for mounting an appliance, such as a computer or television set, for example, in a motor vehicle.

BACKGROUND ART

It is known to provide mounting devices in vehicles to mount computers, televisions, and other types of appliances in such vehicles. These prior art arrangements, however, are generally characterized by their relatively high cost, due at least in part to the fact that such devices ar essentially of custom construction, being specifically designed for a certain type of vehicle and appliance. Then too, most such devices are employed as permanent fixtures, taking up space in relatively cramped vehicle quarters even when their use is not desired. Also, the great majority of conventional vehicle appliance mounting devices are of essentially rigid construction, holding the appliance at a fixed location within the vehicle which may or may not be convenient to the driver or passenger actually using the appliance.

DISCLOSURE OF THE INVENTION

The present invention relates to a device of relatively inexpensive construction for mounting an appliance in a motor vehicle. The device of this invention may readily be attached to or detached from the motor vehicle, as desired. Further, the device of the present invention enables the appliance with which it is associated to be readily positioned at a variety of locations within the vehicle.

The device of the present invention is particularly applicable for mounting an appliance in a motor vehicle having a tunnel, such as an elevated drive shaft tunnel, and a seat adjacent to the tunnel. The device comprises a support element having a support surface in operative association with the appliance and providing support therefor.

The device also includes first stabilizing means connected to the support element and positionable between the tunnel and adjacent seat. Second stabilizing means is also provided, being connected to the support element and adapted to engage the tunnel on opposed tunnel sides when the mount is positioned on the panel with the support surface being disposed over the tunnel. The first and second stabilizing means cooperate to resist movement of the support element relative to the tunnel.

BRIEF DESCRIPTION OF THE DRAWINGS

FIG. 1 is a perspective view of a device constructed in accordance with the teachings of the present invention in operative association with an articulated member and an appliance;

FIG. 2 is a plan view of the device of FIG. 1;

FIG. 3 is an end view of such device;

FIG. 4 is a side view of the device in operative association with a, drive shaft tunnel and adjacent seat; and FIGS. 5, 6 and 7 are frontal, side, and plan views, respectively, of an alternative form of the device.

BEST MODE FOR CARRYING OUT THE INVENTION

Referring now to FIGS. 1–4, a preferred embodiment of a device constructed in accordance with the teachings of the present invention is indicated generally by reference numeral 10. The device includes a support element 12 having a support surface 14. The device further includes first stabilizing means in the form of a flat plate 16 which, in effect, is an extension of support element 12.

Device 10 additionally comprises second stabilizing means in the form of stabilizing elements 20, 22. Stabilizing elements 20, 22 are attached to the support element and extend generally downwardly from opposed sides of the support element. The stabilizing elements have a generally thin, fin-like configuration and diverge away from one another as shown.

In FIG. 1, device 10 is shown in combination with a double-ended articulated member 30 attached to support element 12, as by screws, nuts and bolts or any other suitable connector, at one of said articulated member ends. The other of the articulated member ends, i.e. the distal end, is spaced from support element 12 and includes suitable means such as tray 32 for holding an appliance 34. In the illustrated arrangement, appliance 34 is a computer; however, the present invention may be employed with other types of appliances such as television sets. The articulated member 30 may be of any suitable type and there are a number of suitable articulated members commercially available which may be utilized in combination with the device of the present invention. One example of a suitable articulated member is the CRT Valet Extension Arm, Model 650, manufactured by Microcomputer Accessories, Inc. Articulated members per se are known prior art expedients for supporting and positioning personal computers and other appliances.

Device 10 is intended for use as a mount for an appliance in a motor vehicle having an elevated tunnel, for example, a drive shaft tunnel, and a seat adjacent to the tunnel. Such an arrangement is shown in FIG. 4. wherein the tunnel is designated by reference numeral 36 and the seat adjacent thereto by reference numeral 38.

In operation, device 10 is installed over the tunnel 36 with flat plate 16 disposed between the tunnel and seat and the stabilizing elements 20, 22 positioned on either side of and engaging tunnel 36. The first and second stabilizing means are thus cooperable to resist movement of the support element relative to the tunnel due to the fact that the plate 16 is, in effect, pressed into position. In situations where the seat and tunnel define a somewhat larger space therebetween, it may be desirable to provide a more positive means of attachment for securing plate 16 into position. One suitable approach for accomplishing this is to incorporate an aperture 40 in the plate 16 and provide positive securement by inserting a fastener into the aperture and fastening the tunnel and plate together. One suitable fastener, metal screw 42, is shown.

In the embodiment just disclosed, the support element, first stabilizing means, and second stabilizing means are integrally formed from a suitable relatively rigid material, such as plastic or metal. In the embodiment now to be described, separate adjustable parts are provided so that the device may be readily accommodated to different tunnel sizes and other variable operating environments.

The alternative disclosed embodiment of the present invention is illustrated in FIGS. 5-7. Referring to such figures, device 50 includes a support element 52 having a support surface 54 to which an end of an articulated member (not shown) is normally attached, in the manner of the first disclosed embodiment.

The support element 52 is in operative association with first stabilizing means in the form of a flat plate 56. In this embodiment, plate 56 is adjustable up and down relative to support element 52. Adjustability is provided by connector means including a first bracket member 58 secured to plate 56 and extending at a right angle with respect thereto, and a second racket member 60 secured to the support element 52 and including a leg extending at a right angle with respect to the support element, as shown.

The first and second bracket members are disposed in face-to-face relationship and selectively positionable relative to one another. More particularly, bracket member 60 has a slot 62 formed therein which cooperates with a fastener such as nut and bolt 64 disposed in an aperture formed in first bracket member 58. Thus, plate 56 may be selectively moved up and down to accommodate differing conditions. For example, where a large clearance exists between a seat and tunnel, the plate may be moved up into engagement with the seat and secured thereto by any desired expedient.

The device 50 also incorporates means for providing lateral adjustability, i.e., an arrangement whereby the support element 52 and plate 56 may be moved from side to side relative to the tunnel and seat. In device 50, the stabilizing elements 66, 68 thereof are integrally connected to an adjustment plate 70. Adjustment plate 70 has a slot 72 formed therein which partially extends between the stabilizing elements. A fastener 74 passes through an aperture formed in support element 52 and thence through the slot 72. Thus, the user of the device may readily adjust support element 52 and plate 56 laterally relative to the vehicle tunnel. If desired, the device could also be suitably constructed so as to adjust the distance between the stabilizing elements 66, 68. In this way the device could accommodate tunnels of varying widths.

I claim:

1. A device for mounting an appliance in a motor vehicle having an elevated tunnel and a seat adjacent to said tunnel, said device comprising:
    a support element having a support surface adapted for operative association with said appliance and for providing support for said appliance;
    first stabilizing means including a plate connected to said support element and extending from said support element, said plate positionable between said tunnel and said seat; and
    second stabilizing means connected to said support element and adapted to engage said tunnel on opposed tunnel sides in front of said seat when said mount is positioned on said tunnel with said support surface being disposed over said tunnel, said second stabilizing means comprising a plurality of stabilizing elements having a generally thin, fin-like configuration attached to said support element and extending generally downwardly therefrom, said plurality of stabilizing elements including first and second stabilizing elements spaced from one another and attached to opposed sides of said support element, said plate extending away from said first and second stabilizing elements and generally perpendicular thereto, and said first and second stabilizing means cooperable to resist movement of said support element relative to said tunnel, and additionally comprising adjustable connector means interconnecting said plate and said support element whereby said plate may be selectively moved relative to said support element said adjustable connector means including a first bracket member secured to said plate and a second bracket member secured to said support element said first and second bracket members being selectively positionable relative to each other in at least one direction.

2. The device of claim 1 in combination with a double-ended articulated member attached to said support element at a location on said support element spaced rom said plate at one of said articulated member ends, the other of said articulated member ends being spaced from said support element and including means for holding said appliance.

3. The device of claim 1 wherein said support element and said first and second stabilizing means are integrally formed from a relatively rigid material.

* * * * *